US012741828B2

(12) United States Patent
Vitali et al.

(10) Patent No.: US 12,741,828 B2
(45) Date of Patent: Sep. 22, 2026

(54) TRANSFER DEVICE, PARTICULARLY FOR A PACKING MACHINE

(71) Applicant: G.D S.P.A., Bologna (IT)

(72) Inventors: Antonio Vitali, Bologna (IT); Salvatore Carboni, Bologna (IT)

(73) Assignee: G.D S.P.A., Bologna (IT)

( * ) Notice: Subject to any disclaimer, the term of this patent is extended or adjusted under 35 U.S.C. 154(b) by 604 days.

(21) Appl. No.: 17/998,002

(22) PCT Filed: Jul. 5, 2021

(86) PCT No.: PCT/IB2021/055998
§ 371 (c)(1),
(2) Date: Nov. 4, 2022

(87) PCT Pub. No.: WO2022/009063
PCT Pub. Date: Jan. 13, 2022

(65) Prior Publication Data

US 2023/0202775 A1 Jun. 29, 2023

(30) Foreign Application Priority Data

Jul. 9, 2020 (IT) ........................ 102020000016648

(51) Int. Cl.
*B65G 47/91* (2006.01)
*B65B 5/06* (2006.01)
(Continued)

(52) U.S. Cl.
CPC ............ *B65G 47/918* (2013.01); *B65B 5/068* (2013.01); *B65B 5/105* (2013.01); *B65B 35/24* (2013.01); *B65B 35/38* (2013.01)

(58) Field of Classification Search
CPC ....... B65G 47/918; B65B 5/068; B65B 5/105; B65B 35/24; B65B 35/38
(Continued)

(56) References Cited

U.S. PATENT DOCUMENTS 4,977,727 A * 12/1990 Milleson ................ B65B 35/36
53/247
9,758,265 B2 * 9/2017 Bellante .............. B65G 47/918
(Continued)

FOREIGN PATENT DOCUMENTS

DE 3927848 A1 2/1991
JP H03256820 A 11/1991
(Continued)

OTHER PUBLICATIONS

International Search Report and Written Opinion for International Application No. PCT/IB2021/055998 filed on Jul. 5, 2021 on behalf of G.D S.P.A. Mail Date: Oct. 20, 2021 12 pages.

*Primary Examiner* — Ronald P Jarrett
(74) *Attorney, Agent, or Firm* — Steinfl + Bruno LLP

(57) ABSTRACT

A transfer device for removing articles from a removal zone and depositing them in a discharge zone is described. The transfer device includes a gripping head with retention elements, each configured to retain a respective article. The transfer device further includes a movement mechanism to move at least one retention element on the gripping head between a first configuration, where the retention elements are spaced apart from one another, and a second configuration, different from the first configuration, where the retention elements are brought close to one another. The movement mechanism is configured to move at least one of the retention elements between the first and the second configuration by rotation about a respective rotation axis.

19 Claims, 4 Drawing Sheets

(51) Int. Cl.

| | |
|---|---|
| ***B65B 5/10*** | (2006.01) |
| ***B65B 35/24*** | (2006.01) |
| ***B65B 35/38*** | (2006.01) |

(58) Field of Classification Search
USPC .......................................................... 294/188
See application file for complete search history.

(56) References Cited

U.S. PATENT DOCUMENTS

| | | | | |
|---|---|---|---|---|
| 9,950,822 | B2 | 4/2018 | Lukes et al. | |
| 10,350,769 | B2 | 7/2019 | Richards et al. | |
| 2012/0233967 | A1 | 9/2012 | Bellante | |
| 2022/0396382 | A1* | 12/2022 | Bolognesi | B65B 57/14 |

FOREIGN PATENT DOCUMENTS

| | | | |
|---|---|---|---|
| JP | H0556379 | U | 7/1993 |
| JP | 2001198871 | A | 7/2001 |

* cited by examiner 111
110
112
116
116
100
200
115
30
200
F1
F2
150
200
102
30
200
30
103
200
104
200
105
107
101
108
30
106
120
121
121
121

201
201
200
200
201
201
30
30
30
114
115
112a
1
202
203
115
202
203
116
116
113
112a
111

201
201
201
201
201
201
216
215
216
215
202
210
206b
209
209
206b
206
206
206
206
206a
206a
2
203b
3
1
1
4
203b
1
203a
2
2
4
203b
3

X
X
X
X
204
208
210
212
212
207
207
211
209
212
206
203a
203b
203a 203b
209
209
X
X
209
X
X
209
214
X
203a
209
X
214
209
X
214
210
X
214
203b
X
X
213
209
214
213
213
213
Y
207'

213
213
213
213
X
X
X
X
214
203a
1
1
214
210
214
203a
203b
Y
207'
203b
1
203a 216
216
216
215
215
202
210
206
206
206
206
206
203b
203a
1
1
203b
2
3
4
230a
1

TRANSFER DEVICE, PARTICULARLY FOR A PACKING MACHINE

CROSS REFERENCE TO RELATED APPLICATIONS

The present application is the US National Stage of International Patent Application No. PCT/IB2021/055998, filed on Jul. 5, 2021, which in turn, claims priority to Italian Application No. IT 102020000016648, filed on Jul. 9, 2020.

The present invention relates to a transfer device, particularly configured for the use thereof in a packing machine for articles.

It is also directed to a packing machine comprising such a transfer device and a method for packing articles.

The present invention finds a preferred, though not exclusive, application in the field of canned packing of loose articles, such as capsules for products by infusion, for example coffee, a field to which reference may be made hereafter without loss of generality.

In this sector, packing machines are known which comprise a transfer device which is suitably configured to transfer the articles to be packed by removing them from a removal zone and depositing them in a discharge zone, which may be located at a container intended to be filled.

In a known embodiment, such transfer devices may comprise a gripping head, which is mounted on a movable arm, and which is provided with one or more retention elements capable of retaining in engagement the articles to be transferred from the removal zone to the discharge zone.

Transfer devices are also known which, before discharging the articles and after having removed them, are able to bring the articles close to one another so as to promote the insertion thereof into the container intended to be filled.

In this description as well as in the accompanying claims, certain terms and expressions are deemed to have, unless otherwise expressly indicated, the meaning expressed in the following definitions.

The term “article” means any solid product which, within an industrial production line, can be removed, moved and deposited by a transfer device.

In particular, the transfer device may be configured to remove one or more of these products from a supply line and deposit it in a container which is provided for the transfer thereof or packing thereof.

The articles can be identical to each other, or they can differ from each other in some characteristics such as for example the conformation, the composition, the colour or their orientation.

The articles can be, for example, food and confectionery products already packed in individual containers or wrappers, such as coffee capsules or other infusion drinks, bottles and cartons of beverages, yoghurt pots, individual chocolates (wrapped or bare), candies, small boxes, pouches containing solid, liquid or semi-solid food products; moreover, products of the ceramic industry, absorbent products for hygienic use, products of the tobacco industry, products of the cosmetic industry, products of the pharmaceutical industry, products of the personal & home care industry.

The term “loose” referring to articles means a plurality of single articles which are separated and not secured to each other, so that each of them can be moved and treated independently of the other articles.

A plurality of articles is moved, removed, deposited or otherwise treated “as a group” when all the articles of the plurality are moved, removed, deposited, or otherwise treated, in the same time interval or, in other words, simultaneously.

For example, the articles are rotated “in groups” when they all begin and end a rotational movement at substantially the same instant.

The term “container” means any receptacle that is suitable for containing articles, in particular any receptacle in which the transfer device deposits the articles removed. Preferably the container is a receptacle which is suitable for packing a group of articles. Even more preferably the container is for example a box, a tray or a pallet or a drawer, which is however intended to contain a group of articles in an advantageously sorted manner.

It should also be noted that the expression “moving an object between a first position and a second position” means both the movement from the first position to the second position and the movement from the second position to the first position.

This definition applies equally to similar expressions of movement, such as for example transferring or moving a generic object between two positions or between two zones or even between two different operating configurations.

The expression moving an object “towards” a predefined position, such as for example a point, or an axis, or a surface, means to bring the object close to that predefined position, without necessarily requiring that the movement be conducted along a straight line or that the final position of the object be located on the straight line joining the predefined position with the initial position of the object.

The Applicant, in the context of the constant need to increase the performance and the efficiency of production lines, has preliminarily observed that, in a packing line for articles, the movement speed of the transfer device within its cycle of operation, i.e. when it moves between a zone for removing the articles and a zone for discharging them, can constitute an important element of limitation of the production capacity of the line itself.

This limitation is even more critical if the transfer device has to make several movements also with different trajectories in order to carry out its cycle of operation.

In order to increase the movement speed of the transfer devices, the Applicant has therefore perceived that this speed can be increased by decreasing the inertial mass of the gripping head with which the transfer devices are provided and which must be moved in the trajectories.

In the light of this initial insight, the Applicant then observed that, in some known transfer devices, during the movement of the gripping head between the removal zone and the discharge zone, the transferred articles are brought close to one another by appropriately moving the single retention elements which are provided on the gripping head.

In particular, the Applicant has noted that the retention elements are moved on the gripping head in straight trajectories which are defined by mutually perpendicular directions, generally thanks to the provision of special single linear actuators which control movement of the retention elements on each straight trajectory.

The Applicant has therefore further perceived that the reduction of the inertial mass of the gripping head can be achieved by appropriately modifying the type of movement of the retention elements.

Finally, the Applicant has found that by configuring the gripping head so that the retention elements are brought close to one another by means of a single rotational movement rather than by means of a combination of straight movements, it is possible to use a movement mechanism with fewer and overall lighter components.

Thanks to these features, the gripping head has a simplified construction and an appreciable mass reduction that allows the transfer device to move it more quickly, increasing the production capacity and the efficiency of the packing line.

In a first aspect thereof, therefore, the present invention is directed to a transfer device which is provided to remove a plurality of articles from a removal zone and deposit it in a discharge zone.

Preferably, said transfer device comprises a gripping head.

Preferably, said gripping head is movable between said removal zone and said discharge zone.

Preferably, said gripping head is provided with a plurality of retention elements.

Preferably, each retention element is provided to retain a respective article of said plurality of articles.

Preferably, said transfer device comprises a movement mechanism which is provided to move at least one of said retention elements on said gripping head between a first configuration, in which said retention elements are spaced apart from one another, and a second configuration, which is different from the first configuration, in which said retention elements are brought close to one another.

Preferably, said movement mechanism is configured to move said at least one of said retention elements between said first configuration and said second configuration by means of rotation of said at least one of said retention elements about a respective rotation axis.

Thanks to these features, the transfer device for articles is lighter and can be advantageously moved between the removal zone and the discharge zone at higher speeds, increasing its operating potential, substantially without affecting even the costs related to its movement and its production. In this way it can be used effectively in industrial lines where high production capacity and high efficiency are required.

The Applicant also considers that the same movement of the retention elements between the two configurations described above is faster.

In a second aspect thereof, the present invention relates to a packing machine for articles, comprising at least one transfer device realised according to the first aspect and which is provided to remove a plurality of said articles from a removal zone and deposit them in a discharge zone.

The packing machine according to the invention can advantageously have very high production capacities, while maintaining small overall footprints and dimensions and low costs.

In a third aspect thereof, the present invention relates to a method for transferring a plurality of articles from a removal zone to a discharge zone.

Preferably, the method comprises the step of providing a transfer device comprising a movable gripping head which is provided with a plurality of retention elements.

Preferably, the method comprises the step of removing a plurality of articles by means of said retention elements from a removal zone.

Preferably, the method comprises the step of rotating about respective rotation axes so as to move said retention elements between a first configuration in which said retention elements are spaced apart from one another to a second configuration in which said retention elements are brought close to one another.

Preferably, the method comprises the step of depositing said articles on said discharge zone.

In a fourth aspect thereof, the present invention relates to a method for packing a plurality of articles in a container, wherein said articles are transferred into said container in accordance with the transfer method of the third aspect.

In a fifth aspect thereof, the present invention relates to a method for modifying the configuration of a transfer device for articles comprising a movable gripping head and a plurality of retention elements which are mounted on said gripping head, wherein said retention elements are rotated about respective rotation axes so as to move said retention elements on said gripping head between a first configuration, in which said retention elements are spaced apart from one another, and a second configuration, which is different from the first configuration and in which said retention elements are brought close to one another.

In this way a method is provided which allows to manage the movement of retention elements on a moving gripping head more quickly and efficiently.

The present invention, in at least one of the aforesaid aspects, may have at least one of the further preferred features set out below.

In a preferred embodiment, said gripping head removes said articles from said removal zone when said retention elements are in said first configuration and deposits said articles in said discharge zone when said retention elements are in said second configuration.

In this way, the articles can be removed when they are relatively spaced apart from one another and deposited in a grouped arrangement, which is more compact and advantageous for packing articles in a box.

In another embodiment, said gripping head removes said articles from said removal zone when said retention elements are in said second configuration and deposits said articles in said discharge zone when said retention elements are in said first configuration.

In this case, the articles are removed in a grouped arrangement and then spaced apart from one another before being deposited.

Preferably, in said plurality of retention elements, there is defined a first group of retention elements which is formed by retention elements which are moved between said first configuration and said second configuration, and a second group of retention elements which is formed by retention elements which are not moved between said first configuration and said second configuration.

Preferably, all the retention elements of said first group of retention elements are moved between said first configuration and said second configuration by means of rotation about respective rotation axes.

In this way, the component simplification of the movement mechanism is extended to all the retention elements of the first group.

Preferably, the retention elements of said second group of retention elements are fixed with respect to said gripping head.

This makes it possible to advantageously save the movement components relative to this retention element, with further lightening of the gripping head.

In one embodiment, said second group of retention elements may be formed by one or more retention elements.

In this case, when the retention elements of the first group are moved into said second configuration, they are brought close to the elements of said second group.

In this way, the retention elements can be arranged and configured on the gripping head in many different ways in order to meet different packing needs. In particular, it is possible to deposit the articles in the containers according to an arrangement in separate groups.

In another embodiment, said second group of retention elements does not comprise any retention elements.

In this case, all the retention elements are moved between said first and said second configuration.

Preferably, the articles are loose, so they are removed from the removal zone, transferred or moved and deposited in the discharge zone by retention elements of the gripping head independently of each other.

Preferably, the articles are moved in groups from the removal zone to the discharge zone, and, again in groups, they are deposited in the discharge zone.

In one embodiment, the articles are further removed in groups.

In another embodiment, the articles can be removed from the removal zone in successive steps.

In this way, the articles can be arranged on the gripping head in configurations that are different from those in the removal zone, which greatly allows to increase the operating flexibility of the packing machine.

Preferably, said movement mechanism is configured to simultaneously move said retention elements between said first configuration and said second configuration.

In one embodiment, said rotation axes are substantially parallel to each other.

Preferably, in said discharge zone there is defined a support plane on which said plurality of articles are deposited and said rotation axes are substantially perpendicular to said support plane.

In this way, when the articles are moved in a grouped arrangement as a result of the rotation of the retention elements in the second configuration, they have a reduced footprint with respect to the zone which is defined by the support surface on which they are deposited. In other words, the orthogonal projection of the articles on the support plane is smaller when the retention elements are in the second configuration than in the first configuration.

Thanks to this characteristic, the articles are deposited on the support plane in a more compact way, on the one hand allowing the use of smaller containers (with obvious advantages in terms of production, storage and distribution costs in the market) and on the other hand favouring the deposit operation itself, when it consists of inserting the articles inside an open box, as the preferred form of container.

In one embodiment, said rotation axes are aligned in successive rows.

Preferably, in each row, said rotation axes are equidistant.

Preferably, said rows of rotation axes are equidistant between them.

In this way, the rotation axes have an ordered matrix arrangement and the movement mechanism of the retention elements can be realised more easily.

In one embodiment, said retention elements of said first group, during the rotation towards said second configuration, are all moved towards a central grouping axis.

This provision makes it possible to obtain a particularly compact grouped arrangement of the articles.

Preferably, said central grouping axis is unique and fixed with respect to said gripping head.

Preferably, the straight line joining the positions of each retention element, when it is moved to said first and said second configuration respectively, passes through said central grouping axis.

In a preferred embodiment, said central grouping axis passes through a retention element of said second group of retention elements.

In this case, it is envisaged that this retention element does not vary its position between the first and the second configuration, remaining fixed. In this case, this retention element forms the aforesaid second group of retention elements.

Preferably, the spacing of each retention element from said respective rotation axis is a function of the spacing of said rotation axis from said central grouping axis.

Preferably, during the rotation between said first configuration and said second configuration, said retention element is rotated through approximately 180°.

In this way, the retention element is moved as far as the maximum spacing possible with a rotational movement having a predetermined radius.

In a preferred embodiment, each of said retention elements is mounted to an end of a support rod.

Preferably, said support rod is parallel to said respective rotation axis.

Preferably, said movement mechanism comprises, for each of said retention elements which are rotated, an arm which extends perpendicularly to said rotation axis. Preferably, said arm defines the spacing of said retention element from said rotation axis.

Preferably, in said first configuration and in said second configuration, said arm extends in a direction passing through said central grouping axis.

Preferably, said movement mechanism comprises, for each of said retention elements which are rotated, a pinion which is mounted coaxially with said respective rotation axis.

Preferably, said pinion is coaxially fixed on a shaft which is rotatably mounted on a frame of said gripping head.

More preferably, said shaft is connected to said retention element by means of said arm.

Even more preferably, said arm extends between said shaft and said support rod to which said retention element is mounted.

In a preferred embodiment, said movement mechanism comprises a plurality of racks which are engaged by meshing with said pinions to control the rotation of said pinions about said respective rotation axes.

Preferably, said pinions are aligned in successive rows and the pinions of each row are engaged by a respective rack.

In other words, a single rack is meshed with all the pinions in a single row, so that the number of racks that is required to move all the pinions is equal to the number of successive rows of pinions.

Preferably, said movement mechanism comprises a motor member which is connected to said plurality of racks by means of a transmission shaft.

Preferably, said transmission shaft is unique.

Thanks to each of these features, an effective, precise and, at the same time, particularly simple movement mechanism with a reduced number of components is achieved which makes it even lighter.

In a preferred embodiment, said transfer device comprises a delta-type robot including a plurality of articulated arms to the end of which said gripping head is fixed.

In a preferred embodiment, said gripping head is moved by said articulated arms in trajectories defined by three linear movement axes.

In a preferred embodiment of embodiment, each of said retention elements can be selectively activated and deactivated in order to retain or not to retain in engagement each of said articles independently of the other retention elements.

In this way, it is possible to compose different configurations of articles on the gripping head such as configurations in which there is provided a number of rows greater than that of the rows with which the articles are supplied to the transfer device, or to compose incomplete or partial configurations.

Preferably, said retention elements are connected to a pressure reduction circuit.

Preferably, each retention element is connected to said pressure reduction circuit by means of a respective conduit and can be selectively put in communication with the pressure reduction circuit by means of the opening of a respective shut-off valve.

In this way, the articles are retained by the retention elements through suction.

Preferably, said articles have a substantially truncated cone conformation.

Preferably, said articles have a bottom with a smaller cross-section and a head with a larger cross-section.

In a preferred embodiment, said articles are capsules of a product by infusion, e.g. coffee.

Preferably, said retention elements comprise first retention elements having a first surface and second retention elements having a second surface which is greater than said first surface.

Preferably, said first retention elements are configured to retain said articles at said bottom and said second retention elements are configured to retain said articles at said head.

Preferably, each of said first retention elements is alternated with one of said second retention elements and each of said second retention elements is alternated with one of said first retention elements.

Preferably, said first retention elements are arranged in a quincunx pattern and said second retention elements are arranged in a quincunx pattern in a manner complementary to said first retention elements.

This allows the articles to be removed with an alternating head-bottom and bottom-head orientation, enabling an effective compaction of the articles when they are moved in the grouped arrangement.

In a preferred embodiment, said removal zone is defined on a first conveyor belt on which said articles are transported.

In other embodiments, the removal zone can be defined on a deposit shelf or on a temporary accumulation element (buffer) or on a container.

Preferably, said retention elements are moved into said first configuration to remove said articles from said removal zone.

In this way, the articles can be arranged on the first conveyor belt so that they are relatively spaced apart from one another, thus facilitating their movement and removal by the transfer device.

Preferably, said discharge zone, in which said plurality of articles is deposited, is defined on a container.

Preferably, said container is positioned on a second conveyor belt.

In other embodiments, the discharge zone can be defined on a deposit shelf or a temporary accumulation element (buffer) or on a conveyor belt.

Preferably, said retention elements are moved into said second configuration to deposit said articles in a grouped arrangement in said container.

Preferably, said at least one transfer device is positioned between said first conveyor belt and said second conveyor belt.

Preferably, said at least one transfer device is operative in an area which comprises a portion of said first conveyor belt and portion of said second conveyor belt.

This arrangement of conveyor belts and of the transfer device allows obtaining a packing machine with a particularly compact layout.

Preferably, at least in said area in which said transfer device is operative, said first conveyor belt and said second conveyor belt are moved in respective advance directions which are substantially parallel with each other.

Preferably, said advance directions of said first conveyor belt and said second conveyor belt have opposite directions.

In a preferred embodiment, a plurality of said transfer devices are provided between said first conveyor belt and said second conveyor belt.

Preferably, said transfer devices are all aligned parallel to said advance directions.

This results in a compact machine layout, optimising the operations of the transfer devices.

In a preferred embodiment, said plurality of articles are removed by said retention elements while said removal zone is moving.

In a preferred embodiment, said plurality of articles are deposited by said retention elements in said discharge zone while said support plane is moving.

This makes it possible to create a packing machine that operates substantially continuously, creating the optimal conditions for both reducing the number of transfer devices that are required or the need for intermediate buffers, and for increasing the production capacity thereof, especially when the discharge zone is defined in a container in which the articles are deposited to be subsequently packed.

The characteristics and advantages of the invention will become clearer from the detailed description below of an embodiment illustrated, by way of non limiting example, with reference to the appended drawings wherein.

Figure 1:
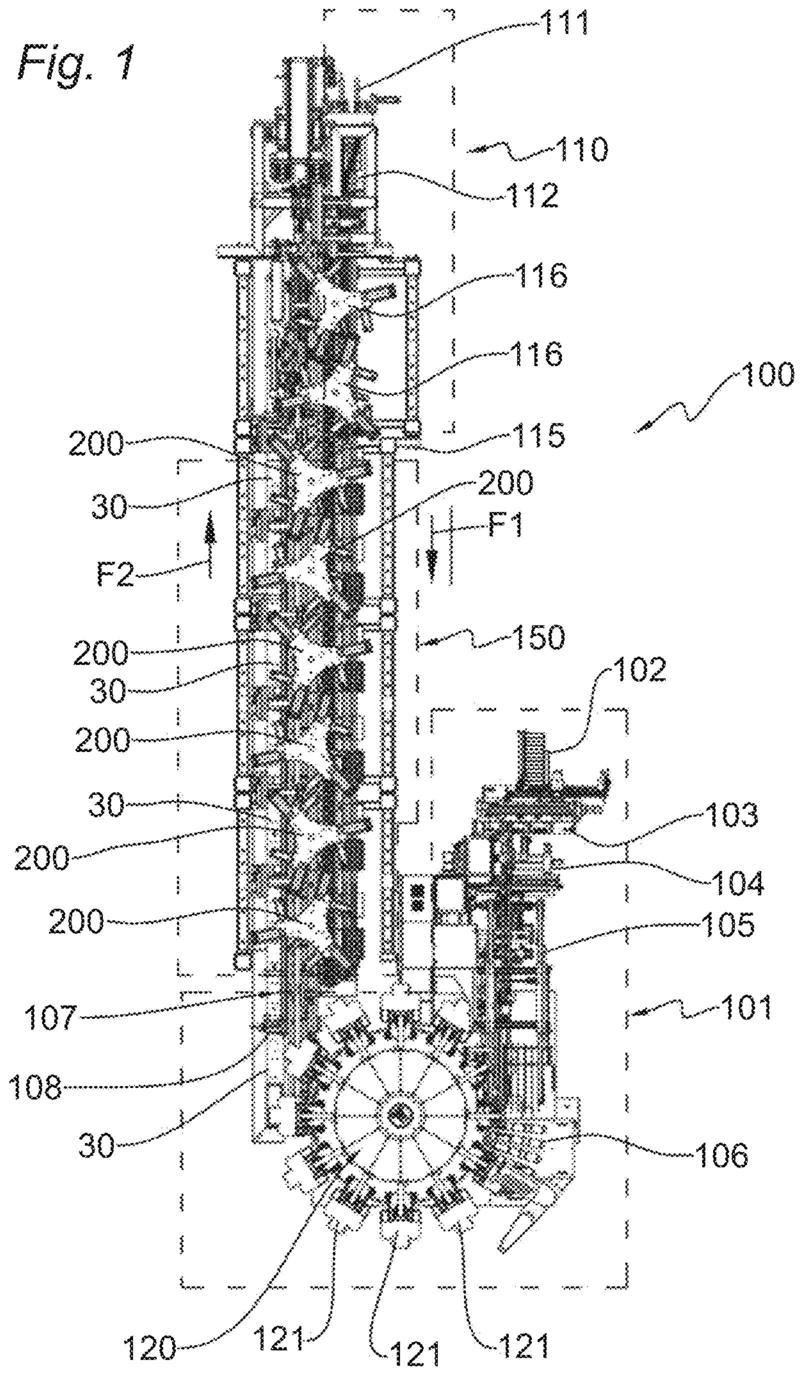
FIG. 1 is a schematic plan view from above of a packing machine for loose articles, provided with transfer devices made in accordance with the present invention.

With reference to the accompanying figures, 100 indicates as a whole a packing machine comprising some transfer devices 200 made in accordance with the present invention.

The packing machine 100 is provided to package a plurality of articles 1, loose, within containers, which in this embodiment example consist of boxes 30, so as to prepare a finished packaging, ready for final packaging and subsequent shipment.

The articles 1 are, in this preferred embodiment example, capsules for the production of drinks by infusion, in particular coffee.

Each article 1 is formed by a substantially rigid casing, shaped like a cup, having a truncated cone form in which a bottom 2, at the smaller base thereof, and a lateral wall 3 which extends with a slight flaring towards a head 4, opposed to the bottom 2, at the larger base thereof, are defined, wherein the casing has a mouth closed by a lid such as, for example, an aluminium foil which is removably fixed to the edges of the mouth.

The packing machine 100 comprises, in its most general units, a forming line 101 of the boxes 30, a sorting line 110 of the articles 1, and a packing line 150, in which the articles 1 coming from the sorting line 110 are deposited in the boxes 30 coming from the forming line 101.

The sorting line 110 is supplied with articles 1 by a first conveyor 111, which transports two rows of articles 1 in upright position, i.e. resting on the bottom 2 and with the head 4 facing upwards.

The first conveyor 111 is connected to a first sorting station 112, comprising, for example, a pair of screw conveyors 112*a*, in which the articles 1 of the two rows of articles are correctly spaced apart from one another and the articles 1 of one of the two rows is tipped in upturned position, i.e. resting on the head 4 and with the bottom 2 facing upwards.

The articles 1 exiting the first sorting station 112 are then supplied to an intermediate conveyor 113, on which two parallel and flanked rows of articles 1 are deposited: one with the articles 1 in upright position and one with the articles 1 in upturned position.

The sorting line 110 of the articles 1 further comprises a second sorting station 114 which takes care of removing the articles 1 from the intermediate conveyor 113 and of depositing them on a first conveyor belt 115 with a predefined removal pattern.

In the present example, also on the first conveyor belt 115 the articles 1 are arranged in two rows, and the predefined removal pattern is of the chequered type, in which each article 1 in upright position is flanked on three sides by articles 1 in upturned position, and vice versa, maintaining a constant spacing among articles 1 in the same row.

To form such a removal pattern, the second sorting station 114 comprises a pair of sorting robots 116 which are arranged in line between the first conveyor 113 and the first conveyor belt 115.

Each sorting robot 116 comprises a gripping hand which is provided to remove, by means of respective retention elements, a plurality of articles 1 which are present on a single row of the intermediate conveyor 113, which will therefore all be in upright position or all in upturned position, and transfer them onto the first conveyor belt 115.

During the transfer towards the first conveyor belt 115, the retention elements, which are initially aligned to remove the articles 1 from a single row of the intermediate conveyor 113, are alternately staggered with each other so as to deposit the articles 1 on the one and the other row of the first conveyor belt 115 in successively alternating positions.

The two sorting robots 116 thus make up the two rows of articles 1 on the first conveyor belt 115, wherein in each row the articles 1 are alternately in upright position and in upturned position, and wherein each article in upright position in one row is flanked by an article in upturned position in the other row, thus altogether forming the desired chequered pattern.

The boxes 30 in which the articles 1 are deposited are formed in the forming line 101 from corresponding blanks 31, each of which consists of a flat semi-finished product made of foldable and semi-rigid material, for example cardboard, which is suitably cut and provided with folding creased portions.

The forming line 101 comprises a supply station 103, wherein the single blanks 31 are extracted from a stack of blanks that is supplied at an inlet 102, as well as a folding station 104, located downstream of the supply station 103, in which the blanks 31 undergo a preliminary folding of some of the flaps thereof before being transferred onto a blanks conveyor 105.

The blanks conveyor 105 crosses a gluing station 106, wherein a plurality of hot glue dispensing guns or nozzles lay suitable glue spots on the blanks 31.

The forming line 101 further comprises a forming carousel 120 supplied by the blanks conveyor 105 which is provided with a plurality of forming devices 121. In the travel period of a portion of the curved tract of the forming carousel 120, the blanks 31 are suitably folded within the forming devices 121 so that the portions provided with glue spots are made to adhere to each other and to form respective boxes 30 having a respective upper closing panel in an open position.

At the end of the curved tract of the forming carousel 120, the boxes 30 are supplied, with the opening facing upwards, onto a second conveyor belt 107. In an initial tract of the second conveyor belt 107, a station 108 is provided that takes care of folding the closing panel of the boxes 30 into an open position, in order to promote the correct filling of the boxes 30 with the articles 1. In other words, the opening position of the closing panel must be such that it does not obstruct the subsequent filling of boxes 30 with articles 1.

As mentioned above, in the packing line 150 the articles 1 coming from the sorting line 110, in particular from the first conveyor belt 115 are deposited in the boxes 30 coming from the forming line 101, in particular from the second conveyor belt 107. Advantageously, at the packing line 150, the first conveyor belt 115 and the second conveyor belt 107 are flanked and are moved linearly in substantially parallel but opposite advance directions, indicated in FIG. 1 with F1 and F2 respectively.

Between the first conveyor belt 115 and the second conveyor belt 107 there is interposed a plurality of transfer devices 200, all of which are aligned parallel to the aforesaid advance directions.

The number of transfer devices 200 is a function of the number of articles 1 intended to be deposited in the single boxes 30 and the speed of the conveyor belts 107 and 115.

Each transfer device 200 is provided to remove a plurality of articles 1 from a respective removal zone and deposit it in a respective discharge zone.

In particular, each transfer device 200 removes a plurality of articles 1 from the first conveyor belt 115 when it crosses the respective removal zone and deposits them in a box 30 which is transported on the second conveyor belt 107 as it crosses the respective discharge zone.

Each transfer device 200 comprises a delta-type robot, which is fixed from above on a support frame (not shown in the accompanying figures), which comprises a plurality of articulated arms 201 and a gripping head 202 which is fixed to an end of the articulated arms 201, according to a configuration that is typical for the delta-type robots.

The gripping head 202 is moved by the articulated arms 201 in trajectories defined by three linear movement axes, while however maintaining its orientation in space fixed (i.e. without rotational movements).

Figures 2, 3:
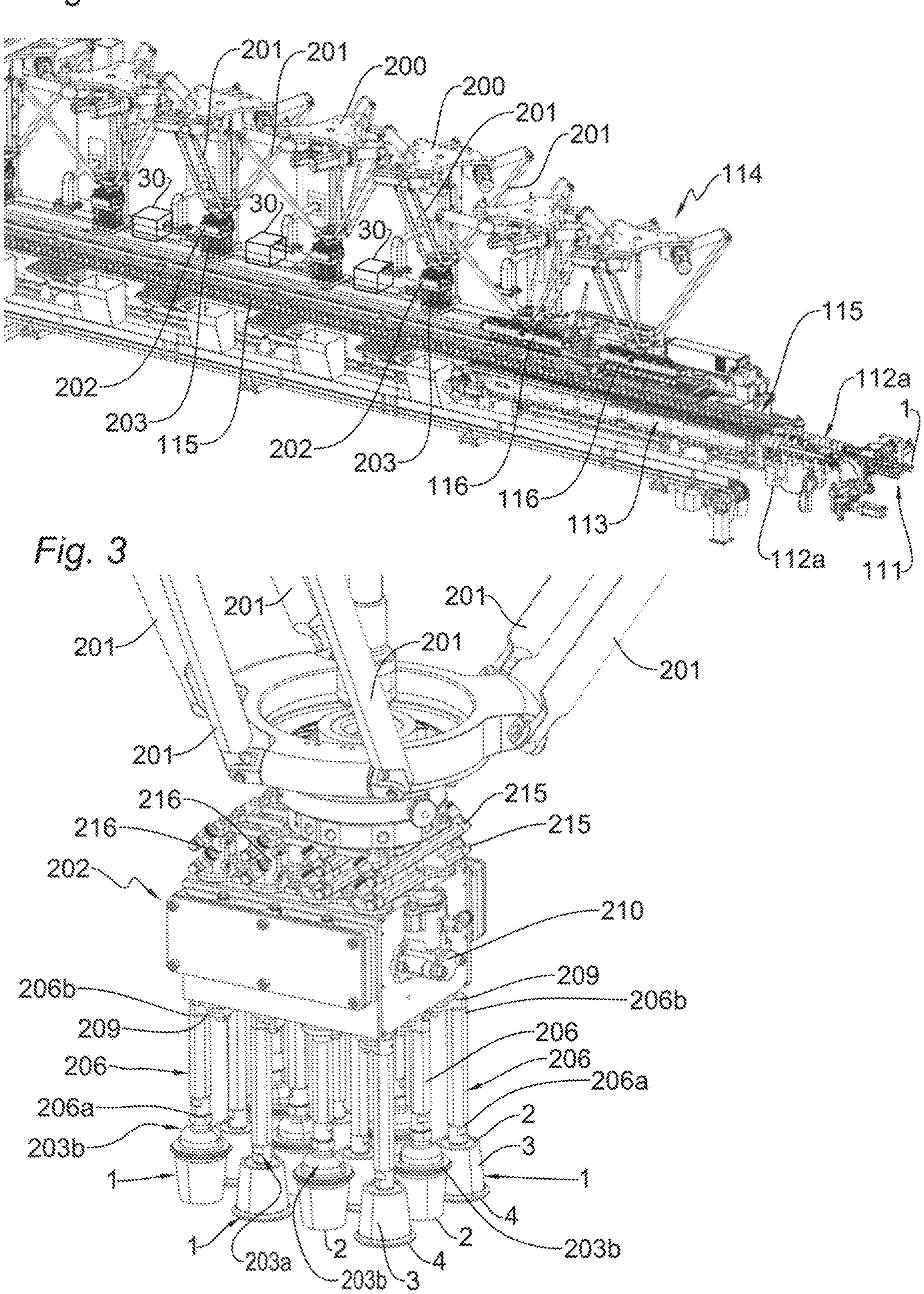
FIG. 2 is a schematic view in lateral perspective and on an enlarged scale of a portion of the packing machine in FIG. 1.
FIG. 3 is a schematic view in lateral perspective from above and on a further enlarged scale of a gripping head of a transfer device of the packing machine of FIG. 1, represented in a first operating configuration.
Figures 6, 7:
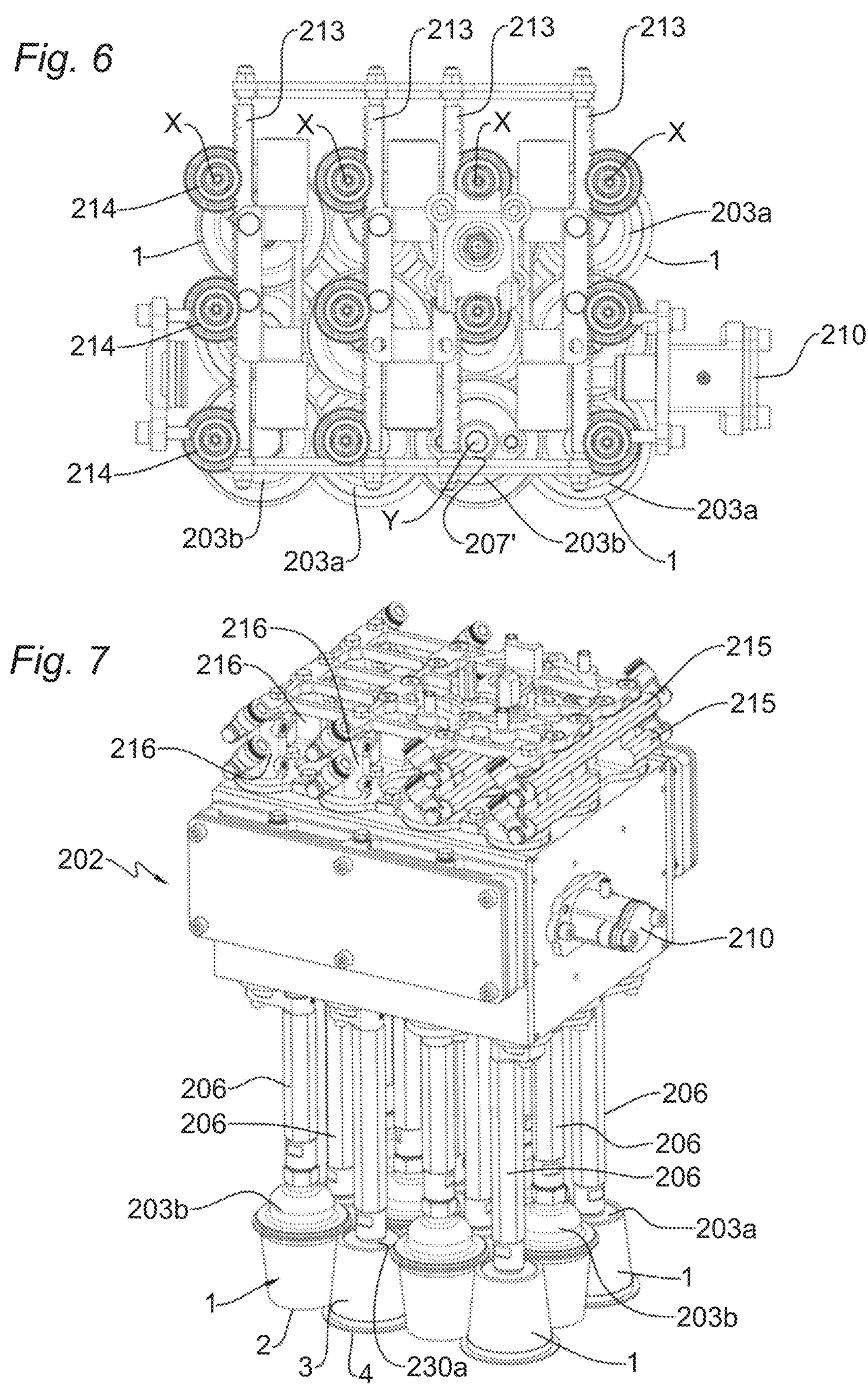
FIG. 6 is a view similar to FIG. 5 of the gripping head, shown in a second operating configuration.
FIG. 7 is similar to FIG. 3 of the gripping head in the second operating configuration.

The gripping head 202 comprises a plurality of retention elements 203, each one provided to retain a respective article 1, and a movement mechanism as a whole identified with 204, which is provided to move the retention elements 203 on the gripping head 202 between a first configuration, in which the retention elements 203 are spaced apart from one another (see FIGS. 3 and 5), and a second configuration, in which the retention elements 203 are brought close to one another (see FIGS. 6 and 7).

In this way, the gripping head 202 is able to remove the articles 1 from the first conveyor belt 115, when the retention elements 203 are in the first configuration, and to deposit them in the box 30 in a grouped, more compact arrangement which is obtained by moving the retention elements 203 to the second configuration.

Each retention element 203 is formed like a suction cup and is fixed to a free end 206*a* of a respective support rod 206, which is connected, at a longitudinally opposed end 206*b* thereof, to the movement mechanism 204.

In particular, the retention elements 203 are divided into first retention elements 203*a*, which are configured to retain the articles 1 at the respective bottom 2 (thus retaining them from above in upturned position), and into second retention elements 203*b*, which are configured to retain the articles 1 at the respective head 4 (thus retaining them from above in upright position).

In particular, the first retention elements 203*a* have a suction cup conformation having a first surface, while the second retention elements 203*b* have a suction cup conformation having a second surface, which is smaller than the first surface.

Figures 4, 5:
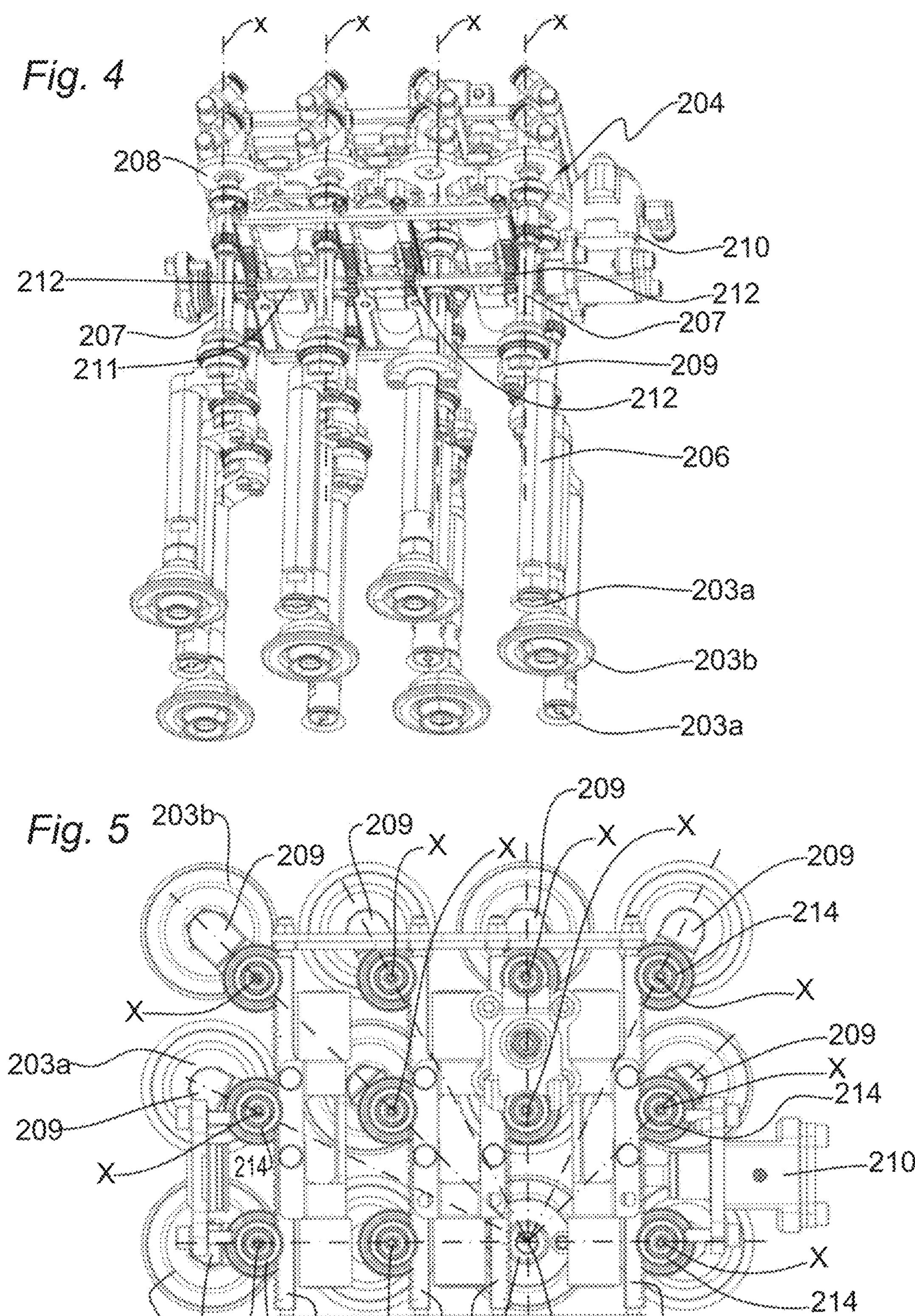
FIG. 4 is a schematic view in lateral perspective from below of the gripping head of FIG. 3 without the external casing and without removed articles.
FIG. 5 is a further simplified, plan view from above of the gripping head in FIG. 3.

The first and second retention elements 203*a*, 203*b* are arranged on the gripping head 202 in alternating position between them, as clearly visible in FIG. 4.

As more fully explained below, the movement mechanism 204 is configured to simultaneously move each retention element 203 between the first and second configuration by means of a rotational movement about a respective rotation axis X.

In particular, the rotation axis X of each retention element 203 is defined by the longitudinal axis of a respective shaft 207, which is rotatably supported on a frame 208 of the gripping head 202 and which extends parallel to the support rod 206.

The shafts 207 are arranged on the gripping head 202 in alignment on successive rows which are equidistant from each other. Furthermore, the shafts 207 that make up each row are also equidistant, so as to make up the formation shown in the accompanying figures, where the particular case is illustrated in which the shafts 207 are arranged in three rows of four support shafts each. Of course, the number of rows and the number of shafts provided for each row can vary according to specific packing needs. In particular, it is preferred that the arrangement in aligned rows of shafts 207 (and consequently of retention elements 203) formed on the gripping head 202 corresponds to the arrangement of articles 1 intended to form a single layer within the specific box 30.

Of course, two or more layers can also be provided in a box 30, even superimposed so as to increase the capacity of each packaging. In this case, the box 30 is filled by means of several successive operations of single layers of articles 1.

The shafts 207, and consequently the rotation axes X defined by them, are all parallel to each other and, in particular, are substantially perpendicular to a support plane which is defined at the discharge zone, and which substantially coincides with the bottom of the box 30 carried by the second conveyor belt 107 on which the articles 1 are to be deposited. Similarly, the shafts 207 are also substantially perpendicular to a support plane which is defined on the first conveyor belt 115 at the removal zone of the articles 1.

The rotational movement of each retention element 203 about the respective rotation axis X is achieved thanks to the provision of an arm 209, which extends perpendicularly to the rotation axis X between the shaft 207 and the end 206*b* of the support rod 206.

In the preferred embodiment described herein, it is envisaged that the retention elements 203, during the rotation from the first configuration to the second configuration, are all moved towards a central grouping axis Y, which is parallel to the rotation axes X.

The extent of each arm 209 is a function of the spacing of the respective rotation axis X from the central grouping axis Y, and in particular, the greater the spacing from the central grouping axis Y, the greater the extent of the arm 209.

The central grouping axis Y coincides with the longitudinal axis of one of the shafts 207, indicated in FIG. 5 as 207', therefore this shaft is coaxially connected to the respective support rod 206, without the need for its own arm 209.

The movement mechanism 204 comprises a motor member 210, for example controlled pneumatically, which is provided to rotate a transmission shaft 211 which is supported with the ability to rotate on the frame 208 of the gripping head 202.

The transmission shaft 211 is provided with toothed crowns 212 engaged by meshing with respective racks 213, which extend parallel to each row of shafts 207 and in turn engaged by meshing with respective pinions 214 which are coaxially fixed on the shafts 207 to be rotated.

Preferably, racks 213 and pinions 214 are dimensioned such that the movement from the first to the second configuration results in the rotation of pinions 214 through approximately 180°. In addition, each arm 209 is extended in a direction passing through the central grouping axis Y in both the first and second configuration (situation shown in FIG. 5 with dotted lines).

In order to retain the articles 1 during the transfer from the removal zone to the discharge zone, each retention element 203 is selectively connected to a pressure reduction circuit 215, associated with the gripping head 202, by means of a respective shut-off valve 216.

In particular, the shut-off valve 216 is capable of putting the pressure reduction circuit in communication with the respective retention element 203 by means of a conduit formed internally to the respective support rod 206, to the arm 209 and to the shaft 207.

The articles 1 are then retained on the respective retention elements 203 thanks to the suction action carried out by the pressure reduction circuit once the retention elements 203 are placed on the bottom 2 or on the head 4 of the articles 1 to be transferred.

Each shut-off valve 216 is operable independently of the other ones, so that each retention element 203 can be selectively activated and deactivated in order to retain or not retain an article 1 in engagement independently of the other retention elements 203.

Each transfer device 200 of the packing machine 1 operates as described below.

The gripping head 202 is moved by the arms 201 at the removal zone, above the first conveyor belt 115 on which the articles 1 to be removed are arranged in a chequered pattern.

In this position, the retention elements 203 are moved in the first position, so that the spacing between them corresponds to the spacing between the articles arranged on the first conveyor belt 115. The gripping head 202 is then lowered onto the articles 1, equalizing the speed of the first conveyor belt 115, which maintains its movement unchanged, until it abuts with the retention elements 203 of the articles 1 to be removed. The first and the second retention elements 203*a* and 203*b* are alternated with each other, mirroring the chequered arrangement of the articles 1, so that each first retention element 203*a* is lowered onto an article 1 in upturned position and each second retention element 203*b* is lowered onto an article 1 in upright position.

All shut-off valves 216 of the retention elements 203 to be activated are thus opened, so as to put them in communication with the pressure reduction circuit 215 and to suck in the articles 1 to be removed.

If necessary, the gripping head 202 may be moved over another group of articles 1 brought within the removal zone by the first conveyor belt 115, so as to remove further articles 1 with the retention elements 203 that are still free and to complete the composition of a layer of articles 1 to be deposited in the box 30. Of course, the operation of completing the layer of articles 1 on the gripping head 202 may require one or more removal steps, as a function of the composition of the layer (and thus, more generally, as a function of the size of the box 30 to be filled).

Once the removal of the articles 1 to be deposited is ended, the gripping head 202 is moved towards the discharge zone, at a box 30 brought onto the second conveyor belt 107.

During the movement of the gripping head 202 towards the discharge zone, the first retention elements 203 are simultaneously rotated in the second configuration, so as to bring the articles 1 close to one another and to compact them in a grouped arrangement (clearly visible in FIG. 7), which is suitable for allowing their rapid insertion into the box 30.

The rotation of the retention elements 203 about their respective rotation axes X is obtained by controlling the rotation of the motor member 210 which, by means of the transmission shaft 211, linearly moves the racks 213 and, thanks to the engagement with the pinions 214, causes the rotation of the shafts 207 and thus of the retention elements 203.

Upon reaching the discharge zone with the retention elements 203 which have been moved to the second configuration, the gripping head 202 is moved towards the box 30, and by equalizing the speed of the second conveyor belt 107, it deposits the articles 1 in group inside the box, deactivating the retention elements 203 by closing the shut-off valves 216.

The articles 1 are deposited on the bottom of the box 30 or on a layer of articles 1 that has already previously been deposited in box 30.

Preferably, in case more than one layer is deposited in the box 30, it is provided that the articles 1 of one layer are arranged in an upturned arrangement with respect to the articles 1 of the layer below on which they rest. In this way, each article in upright position of the upper layer rests on an article in upturned position of the lower layer and an article in upturned position of the upper layer rests on an article in upright position of the lower layer.

Once the articles 1 have been deposited, the gripping head is then lifted and as it is moved towards the first conveyor belt 115 for a new removal of articles, the retention elements 203 are rotated in the first configuration in order to be spaced apart from one another.

In a different operating mode, the transfer device 200 according to the present invention may be used to remove the articles 1 from a box 30, in particular an incomplete or damaged box, and to deposit the articles 1 at, for example, an auxiliary shelf, from which, for example, the articles 1 may subsequently be removed to be inserted inside a subsequent box 30. In this case, the removal zone is defined in the box 30 and the discharge zone is defined in the auxiliary shelf. It is understood that instead of an auxiliary shelf, the articles may be deposited in another receptacle or on a conveyor belt.

It goes without saying that a person skilled in the art may, in order to meet specific and contingent application requirements, make further modifications and variants of the above-described invention within the scope of protection as defined by the following claims.

The invention claimed is:

1. A transfer device for removing a plurality of articles from a removal zone and depositing said plurality of articles in a discharge zone, comprising:

a gripping head movable between said removal zone and said discharge zone, the gripping head comprising a plurality of retention elements, the plurality of retention elements comprising a first group of at least two retention elements and a second group of at least one retention element, each retention element of the plurality of retention elements configured to retain a respective article of said plurality of articles, wherein the first group of said retention elements on said gripping head is moveable between a first configuration, where each of said plurality of retention elements are spaced apart from one another, and a second configuration, different from the first configuration, where each of said plurality of retention elements are brought closer to one another, wherein each of said retention elements of said first group is moveable between said first configuration and said second configuration by rotation of said each of said retention elements of said first group about a respective rotation axis of each respective retention element, wherein the respective rotation axis of each retention element is a longitudinal axis of a respective shaft corresponding to each retention element, wherein all retention elements of said first group of retention elements are moved towards a fixed central grouping axis during rotation towards said second configuration, wherein said fixed central grouping axis passes through a retention element of said second group of retention elements, and wherein said retention elements of said second group are fixed with respect to said gripping head.

2. The transfer device according to claim 1, wherein said second group of retention elements is configured not to be moved between said first configuration and said second configuration.

3. The transfer device according to claim 1, wherein a spacing of each retention element from said respective rotation axis is a function of a spacing of said respective rotation axis from said fixed central grouping axis.

4. The transfer device according to claim 1, wherein said discharge zone comprises a support plane, on which said plurality of articles are deposited, said rotation axes being substantially perpendicular to said support plane.

5. The transfer device according to claim 1, wherein, in the rotation between said first configuration and said second configuration, at least one retention element of said plurality of retention elements is rotated approximately 180°.

6. The transfer device according to claim 1, further comprising, for each of said retention elements of the first group, an arm extending perpendicularly to said respective rotation axis and which defines a spacing of said retention element from said respective rotation axis.

7. The transfer device according to claim 6, wherein, in said first configuration and in said second configuration, said arm extends in a direction passing through said fixed central grouping axis.

8. The transfer device according to claim 1, wherein said plurality of retention elements are connected to a pressure reduction circuit in order to retain said articles by suction.

9. A packing machine for articles, comprising at least one transfer device according to claim 1.

10. The packing machine according to claim 9, wherein said removal zone is defined on a first conveyor belt, on which said articles are conveyed.

11. The packing machine according to claim 9, wherein said retention elements are moved into said first configuration in order to remove said articles from said removal zone.

12. The packing machine according to claim 9, wherein said discharge zone, in which said plurality of articles are deposited, is defined on a container positioned on a second conveyor belt.

13. The packing machine according to claim 12, wherein said plurality of retention elements are moved into said second configuration in order to deposit said articles in a grouped arrangement in said container.

14. The packing machine according to claim 12, wherein said at least one transfer device is positioned between said first conveyor belt and said second conveyor belt and is operative in an area comprising a portion of said first conveyor belt and a portion of said second conveyor belt, and at least in a region of said area, said first conveyor belt and said second conveyor belt are moved in respective advance directions substantially parallel and opposite with each other.

15. A method for transferring a plurality of articles from a removal zone to a discharge zone, comprising:

providing a transfer device comprising a movable gripping head including a plurality of retention elements, the plurality of retention elements comprising a first group of at least two retention elements and a second group of at least one retention element, removing a plurality of articles from the removal zone by said retention elements, rotating said retention elements about respective rotation axes to move said retention elements between a first configuration, where said retention elements are spaced apart from one another, and a second configuration, different from the first configuration, where said retention elements are brought closer to one another, and depositing said articles on said discharge zone, wherein the respective rotation axis of each retention element is a longitudinal axis of a respective shaft corresponding to each retention element wherein all retention elements of said first group of retention elements are moved towards a fixed central grouping axis during rotation towards said second configuration, wherein said fixed central grouping axis passes through a retention element of said second group of retention elements, and wherein said retention elements of said second group are fixed with respect to said gripping head.

16. The method according to claim 15, wherein said plurality of articles are removed by said retention elements while said removal zone is moving.

17. The method according to claim 15, wherein said plurality of articles are deposited by said retention elements on said discharge zone while said discharge zone is moving.

18. A method for packing a plurality of articles in a container, the method comprising:

transferring said articles from the removal zone to the discharge zone defined in said container in accordance with the method of claim 15.

19. A method for modifying a configuration of a transfer device for articles comprising a movable gripping head and a plurality of retention elements mounted on said gripping head, the plurality of retention elements comprising a first group of at least two retention elements and a second group of at least one retention element, the method comprising:

rotating said retention elements about respective rotation axes to move said retention elements on said gripping head between a first configuration, where said retention elements are spaced apart from one another, and a second configuration, different from the first configuration, where said retention elements are brought closer to one another, wherein the respective rotation axis of each retention element is a longitudinal axis of a respective shaft corresponding to each retention element, wherein all retention elements of said first group of retention elements are moved towards a fixed central grouping axis during rotation towards said second configuration, wherein said fixed central grouping axis passes through a retention element of said second group of retention elements, and wherein said retention elements of said second group are fixed with respect to said gripping head.

* * * * *